May 7, 1940.　　　　G. R. KELTIE　　　　2,200,176
SQUEEZE ROLL ASSEMBLY
Filed April 5, 1939
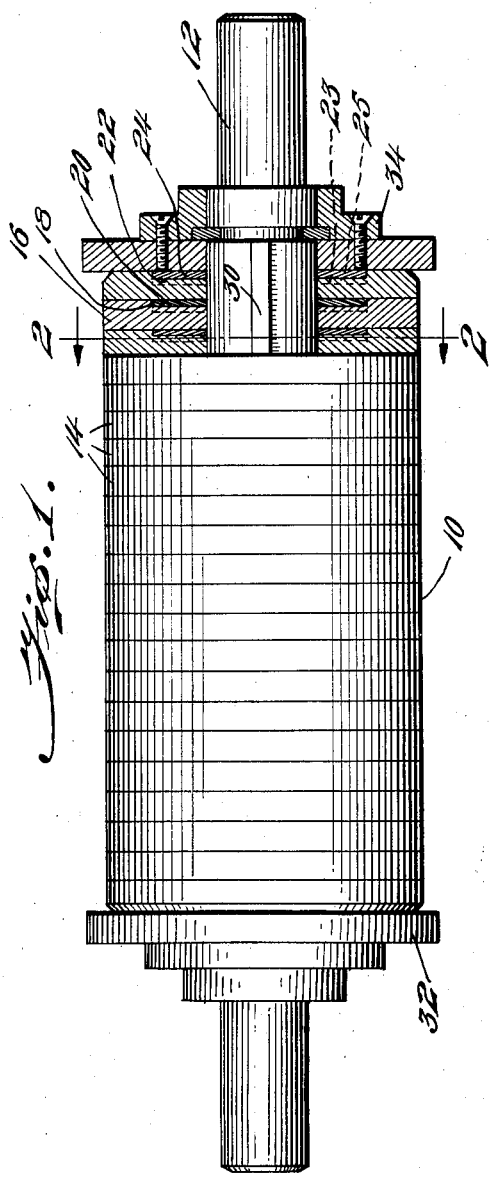
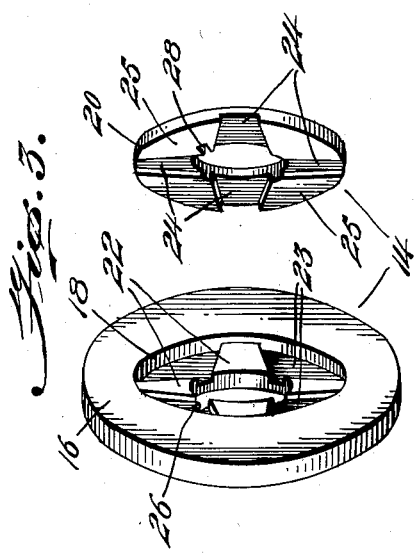
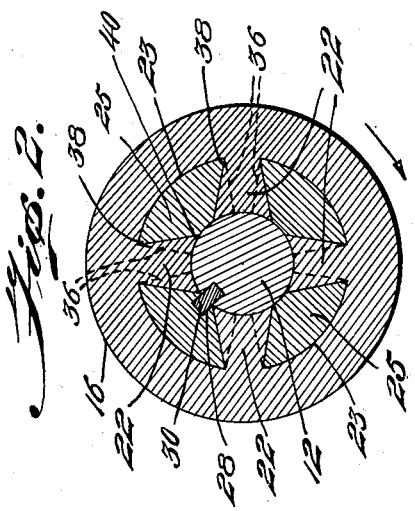
Inventor
George R. Keltie
By Thomas A. Jenks
Attorney Patented May 7, 1940

2,200,176

UNITED STATES PATENT OFFICE 2,200,176

SQUEEZE ROLL ASSEMBLY

George R. Keltie, Woonsocket, R. I., assignor to American Wringer Company, Woonsocket, R. I., a corporation of Rhode Island Application April 5, 1939, Serial No. 266,086

5 Claims. (Cl. 68—277)

My invention relates to improvements in a squeeze roll assembly, preferably of the type having a plurality of sectional pressing units which may be individually replaced in the squeeze roll assembly. In certain respects, my invention includes improvements on the type of roll shown in Patent No. 900,055, issued Sept. 29, 1908, to Ira F. Burnham, for Squeeze-roll for wool-washing machinery.

While my improved squeeze roll assembly is adapted for a variety of uses, it is particularly adapted for use as a wool scouring squeeze roll. Like the type of roll shown in the Burnham patent, it employs pressing units, each comprising an annular resilient section having a central axial cavity within a side wall thereof, and a reinforcing member or disc of substantially the shape and axial thickness of said cavity contained within its respective resilient annular section. In the type of roll shown in said Burnham patent not only are two reinforcing members provided for each section fitting in their respective cavities, but also to provide traction from the reinforcing disc members to the resilient annular section, a plurality of radial ribs are provided in each disc adapted to fit into a plurality of cooperating similar radial channels in the resilient section.

It has been found that when traction has been exerted on the Burnham roll that it will tend to wear out the annular resilient section adjacent the tops of each of these ribs on one side thereof and adjacent the bottoms of said ribs on the opposite side thereof, thus providing an annular leverage to tend to urge the annular resilient section radially outward in use as it is rotated.

An object of my invention is to provide the respective ribs and channels of truncated triangular shape for several reasons to be explained, and so that as there is wear on the resilient ribs adjacent opposite top and bottom edges thereof, considerable wear must take place until such portions of the ribs are worn off to lines radial or normal to the axis of the shaft, and thus no leverage can be exerted tending to force the annular section circumferentially outwardly of its reinforcing disc and shaft for substantially the life of the squeeze roll assembly. This is due to the fact that the side walls of the truncated triangular ribs converge from the center of the shaft instead of being normal thereto, as in the Burnham structure.

A further object of my invention is to provide a construction wherein the ribs extend all the way to the shaft, thus making the use of a more resilient or softer rubber possible.

A further advantage of my invention, closely allied thereto, is that there is a greater area on the contacting rib surfaces, thus distributing the inertia of the load over a greater area and lessening the strain on the individual resilient rubber ribs.

A further object of my invention, due to the wedge shape of the ribs, is that I am enabled to provide a wedging action continuously holding all portions of the periphery of the roll towards the shaft in case any portion thereof should break down and to resist the tendency of centrifugal force, to wedgedly retain each respective annular resilient section centrally of the assembly.

These and other objects of my invention as may hereinafter appear will be best understood from a description of an embodiment thereof, such as is shown in the accompanying drawing.

In the drawing,

Fig. 1 is a side elevation of a squeeze roll assembly constructed in accordance with my invention, with portions of one end thereof shown in section.

Fig. 2 is a vertical sectional view taken along the line 2—2 of Fig. 1.

Fig. 3 is a disassembled perspective view of a sectional pressing unit showing the reinforcing disc opposite its respective cavity in its respective annular resilient section with the respective similarly shaped ribs and channels thereof in alignment prior to insertion of the reinforcing disc within its cavity in the resilient section.

In the drawing, wherein like characters of reference generally indicate like parts throughout, 10 generally indicates a squeeze roll assembly constructed in accordance with my invention. Said assembly includes the shaft 12 and a plurality of sectional pressing units 14, means to mount said pressing units 14 against relative rotation on said shaft and means to axially compress said pressing units on said shaft to provide the squeeze roll assembly. Each pressing unit comprises an annular resilient section 16 having a central, preferably cylindrical, cavity 18 within a side wall thereof, and a reinforcing disc of substantially the shape and preferably the axial thickness of said cavity 18, wedgedly secured against relative radial movement within said axial cavity 18, and in my preferred embodiment each respective reinforcing disc 20 is completely contained within the cavity in its respective annular resilient section.

In my preferred embodiment shown, I provide a plurality of spaced radial ribs 22 projecting axially within said cavity 18, and I provide a plurality of cooperating similarly spaced substantially similar radial channels 24 on the cooperating side wall of the reinforcing disc 20 to contain said respective ribs 22 and in my preferred embodiment said ribs 22 and cooperating channels 24 taper outwardly to comprise truncated triangular ribs and channels, to provide wedge means to retain each respective resilient section against relative radial movement on said shaft, the base of each respective triangle being at the inner portions of the ribs and channels adjacent the shaft, and the apex of each respective triangle being truncated at the outer ends of said respective ribs and channels within the cavity 18 and on the disc 20 respectively. It is obvious that due to the triangular shape of the tapered walls of the said respective ribs and channels that the resilient sections are wedgedly retained to their respective reinforcing discs. It is also obvious that the ribs 22 form supplemental inverted truncated triangular cavities or sectors 23 between them in the cavities 18, complemental thereto to make up the cylindrical cavity 18, and that the channels 24 in the side wall of said disc 20 form between them cooperating, inverted truncated ribs 25 complemental thereto fitting within said inverted truncated cavities or sectors 23 to provide the flat even cylindrical end wall for the unit 14 with the end surfaces of each resilient member 16 and disc 20 contained therein flush with each other.

While the resilient annular sections 16 may be made of any suitable material, they are preferably made of a resilient material, such as rubber. The reinforcing discs 20 may be made of any convenient material, but are preferably made of metal.

As means to mount said pressing units 14 against relative rotation on said shaft 12, each of said resilient sections 16 and reinforcing discs 20 are provided with the aligned respective axial grooves 26 and 28 therein, to receive the continuous axial spline 30 on the shaft 12.

Any suitable type of means may be provided to axially compress the respective pressing units 14 on said shaft 12 to provide a squeeze roll assembly such as the stationary collar 32 rigidly mounted on one end of said shaft and the removable collar 34 detachably securable to the opposite end of said shaft. In the embodiment shown the collar 34 comprises an integral collar and hub for this purpose.

Each respective reinforcing disc is first inserted within its respective cavity to make up the individual pressing units 14 which may be respectively threaded onto the shaft 12 and when the removable collar 34 is mounted on and secured to said shaft in compressing position, it is obvious that said units will form a complete assembly after the removable collar has secured the respective pressing units 14 in place. If a pressing unit 14 should wear out, it is obvious that it may be selectively removed and replaced by another, without disturbing the other pressing units 14.

In use, it is apparent that the cooperative wedge shape of the ribs 22 and channels 24 will function to retain each respective annular section in position at all times on the shaft 12. It is also apparent, as shown by the radial lines 36 leading from the edges of each truncated triangular top of each respective rib and channel that considerable wear must take place adjacent the upper edge of one side wall 38 of the respective rib and opposite the lower side wall 40 before any leverage action tending to throw the annular section away from its respective shaft can possibly take place. It is also apparent that inasmuch as the ribs 22 extend to the shaft 12, that there will be a greater area of contact, thus limiting the inertia of the load on the roll and strain on the ribs, and additionally permitting the use of softer rubber.

I employ the word "disc" to signify a flat reinforcing member whether it be of true cylindrical shape or otherwise. It is also obvious, though the structure is not quite so desirable, that the respective positions of the ribs and channels may be reversed within the scope of the appended claims.

It is apparent therefore that I have provided a novel type of squeeze roll assembly with the advantages described above.

It is understood that my invention is not limited to the specific embodiment shown and that various deviations may be made therefrom without departing from the spirit and the scope of the appended claims.

What I claim is:

1. A squeeze roll assembly comprising a shaft, a plurality of sectional pressing units, each comprising an annular resilient section having a central axial cavity within a side wall thereof having a plurality of spaced radial ribs projecting axially within and a reinforcing disc of substantially the shape and axial thickness of said cavity having a plurality of cooperating similarly spaced substantially similar radial channels therein containing said ribs, whereby each reinforcing disc may be completely contained within its respective resilient annular section, said ribs and cooperating channels tapering outwardly to provide wedge means to retain each respective resilient section against relative radial movement on said shaft, means to mount said pressing units against relative rotation on said shaft, and means to axially compress said pressing units on said shaft to provide a squeeze roll assembly.

2. A squeeze roll assembly comprising a shaft, a plurality of annular resilient sections, each having a central axial cavity within a side wall thereof having a plurality of spaced radial truncated triangular ribs projecting axially within said cavity, reinforcing discs of substantially the shape of said cavities having a plurality of cooperating similarly spaced substantially similar radial truncated triangular channels therein containing said ribs, means to mount said resilient sections and reinforcing discs against relative rotation on said shaft, and means to axially compress said resilient sections and reinforcing discs on said shaft to provide a squeeze roll assembly.

3. A sectional unit for a squeeze roll assembly comprising an annular resilient section having a central axial cavity within a side wall thereof having a plurality of spaced radial truncated triangular ribs projecting axially within and a reinforcing disc of substantially the shape and axial thickness of said cavity having a plurality of cooperating similarly spaced substantially similar radial truncated triangular channels therein containing said ribs.

4. A sectional unit for a squeeze roll assembly comprising an annular resilient section having a central axial cylindrical cavity within a side wall thereof having a plurality of spaced radial ribs projecting axially within and a reinforcing disc of substantially the shape and axial thickness of said cavity having a plurality of cooperating similarly spaced substantially similar radial channels therein containing said ribs, whereby each reinforcing disc may be completely contained within its respective resilient annular section, said ribs and cooperating channels tapering outwardly to provide wedge means to retain each respective resilient section against relative radial movement on a shaft, 5. An annular resilient section for a squeeze roll assembly having a central axial cavity within a side wall thereof, having a plurality of spaced radial truncated triangular ribs projecting axially within said cavity.

GEORGE R. KELTIE.